Nov. 9, 1926.  
H. R. STRATFORD  
1,606,271  
METHOD OF MAKING CURVED RUBBER STRIPS  
Filed May 22, 1920

Inventor  
Herbert R. Stratford  
By Fay, Oberlin & Fay  
Attorneys

Patented Nov. 9, 1926.

1,606,271

UNITED STATES PATENT OFFICE.

HERBERT R. STRATFORD, OF CLEVELAND, OHIO.

METHOD OF MAKING CURVED RUBBER STRIPS.

Application filed May 22, 1920. Serial No. 383,527

The present invention, relating, as indicated, to curved rubber strips, and a method of making the same, is directed particularly to the manufacture of a rubber strip which is designed to be used in making rubber tubes by the method described in my co-pending application, Serial No. 362,049. In the invention of such application I take two strips of rubber and join them together to form a tube by first laying or packing one of these strips into a peripheral semi-circular groove on a roll, and then superimposing the second of the strips upon the first, at the same time rotating the first-named roll against a cutting-off roll which serves to press together the superimposed edges of the two strips, cut off any excess rubber and unite these edges firmly together. After the tube has thus been formed the roller upon which it is formed is separated and the tube is removed and cured.

Under certain conditions it may be desirable to preliminarily form each of the two strips which are used in the above-named method in order to give these strips a circular form and adapt them to fit more readily and perfectly about the forming roll and against each other, and it is for this purpose that the present invention is designed. To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principles of my invention.

In said annexed drawing:—

Figure 1:
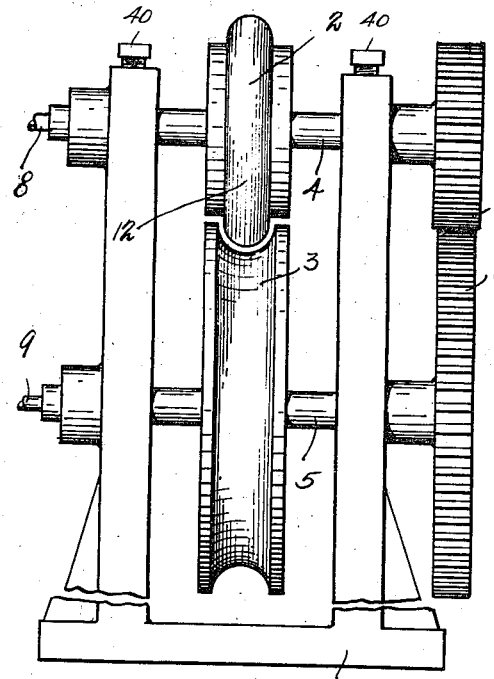
Figure 2:
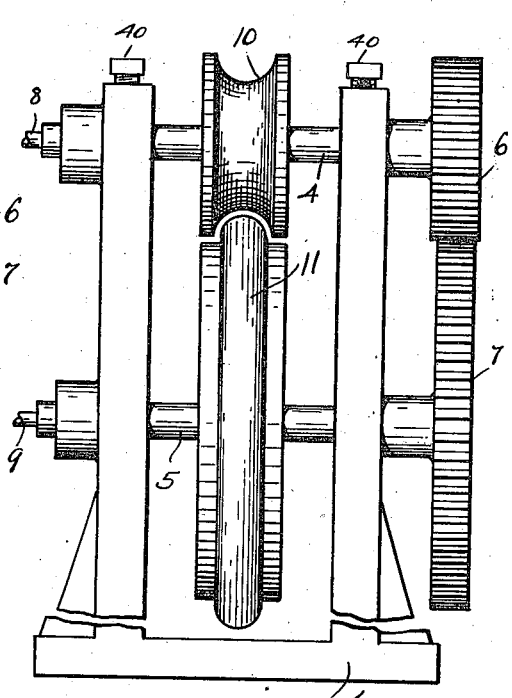
Figure 3:
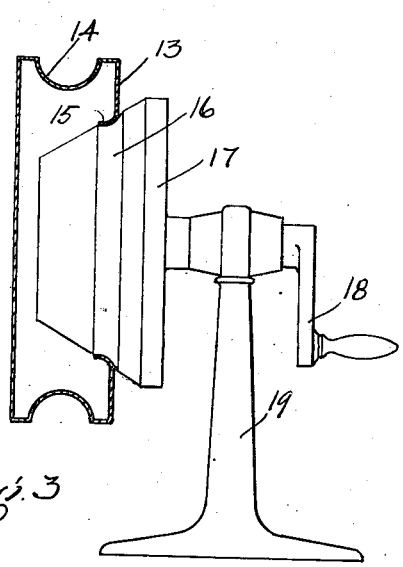
Figure 4:
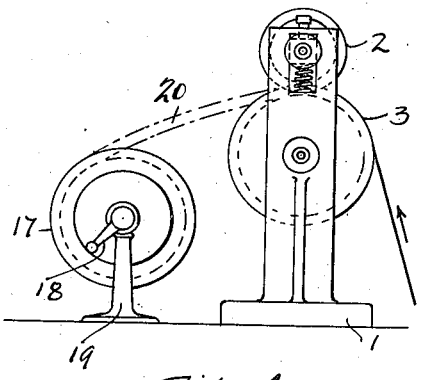

Fig. 1 is a front elevation of an apparatus designed to carry out the present improved method for making the inner half or portion of the tube; Fig. 2 is a similar view of an apparatus for making the outer portion of the tube; Fig. 3 is a side elevation of a machine for storing the prepared strips; and Fig. 4 is a view in side elevation showing the connection between the machines of Figs. 1 and 2 and Fig. 3.

In Fig. 1 I have shown a machine consisting of a base or framework 1, within which are mounted two parallel rolls 2 and 3 carried on parallel shafts 4 and 5, respectively, which are operated in unison by means of gears 6 and 7, which may be driven from any suitable source of power. The shafts 4 and 5 are provided with longitudinally extending central passages, which may be connected to any suitable heating means through conduits 8 and 9 for heating the rollers if desired. The machine shown in Fig. 2 is identical with that of Fig. 1, except for the rolls 10 and 11, which are transposed in order to form the outer portion of the tube instead of the inner portion, as is the case of the machine in Fig. 1. In each case the upper roll may be adjusted toward or away from the lower roll to vary the thickness of the finished strip by means of the bolts 40.

In my method of making tubes, which is described in the co-pending application previously referred to, the chief object is to provide a tube which shall be truly circular and without wrinkles or bulges, as is the case where tubes are formed and cured straight and then circled and joined. It is of advantage in such a method if the strips which are superimposed to form the tubes are preliminarily partially formed in a true circular shape, and to accomplish this result I lay a flat strip of rubber upon the circumference of the lower roll 3 in the machine of Fig. 1. This strip is of sufficient width to completely cover the exposed surfaces of this roll, and upon rotation of the roll the strip is pressed down into the semicircular interior of the roll by means of the projecting semi-circular portion 12 on the upper roll. The strips may either be formed of the proper length before insertion between the rolls, or the strip may be rolled until a sufficient amount for one tube length has been passed between the two rolls and then cut off. The action of this machine is to give the plastic or raw rubber strip a curvature approximating that of the tube which is to be formed. The action of these two rolls is similar to that of calender rolls, in which the rubber is rolled or molded to the thickness and shape which is desired, and if the rolls are heated, as they may be by introducing a heating fluid through the conduits 8 and 9, the rubber is to a slight extent "set" exactly as if it were passed between the ordinary types of calender rolls. If desired, instead of supplying the rubber in the form of strips, uncured rubber may be fed into the rolls, as is the common practice with calender rolls.

Either the inner or outer strip, for formation into the tube, may be formed in this apparatus by simply transposing the rolls, or rather the shapes of the rolls as indicated in Figs. 1 and 2. After the strip has been rolled in the machines of Figs. 1 and 2 it is carried out and onto a mandrel 13, which is provided with either a semi-circular recess 14, or with a semi-circular projection, depending upon whether the strips to be received therein are the inner or outer sections, and is then rolled up onto this mandrel and its ends lightly joined for storage thereon until it shall be required for use in the tube-forming machine of my co-pending application. It may then be easily stripped from the mandrel and used in such machine.

The mandrels 13 are formed of relatively thin and light sheet metal and are provided with an annular curved and flexible strip 15, which is adapted to be sprung over and into a groove 16, which is provided on the face of a roll 17 in the machine of Fig. 3. This machine is merely a pulley in the form of a roll 17 operated by means of a handle 18 and supported upon a suitable base 19. The latter should be of such a height that the mandrel 13 may be positioned in front of, and slightly below the roll 3, so that the strip 20, as it leaves the roll 3, may retain its curved form as it is passed on to the mandrel.

As fast as the strips are provided in the manner described, and are placed upon mandrels 13, these mandrels are transferred to the tube-forming machines and are there used as required, the mandrel then being returned to receive new prepared strips.

While it is unnecessary to preliminarily prepare the strips which are joined to form the tubes by the methods described in my co-pending application, it is sometimes desirable that they be so prepared as it saves the time of the operator in inserting the strips in the tube-forming machine, and makes more perfect tubes.

Other forms may be employed embodying the features of my invention instead of the one herein explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making curved rubber strips, the steps which consist in rolling a flat raw rubber strip between rolls having a semi-circular peripheral cross-section, and then transferring said strip from said rolls to an annular member upon which said strip will retain its longitudinally and transversely curved condition.

2. In a method of making curved rubber strips, the steps which consist in calendering a flat strip of raw rubber between rolls having a semi-circular peripheral cross-section, and then transferring said strip from said rolls to an annular member upon which said strip will retain its longitudinally and transversely curved condition.

3. In a method of preparing rubber strips for manufacture into tubes, the steps which consist in rolling a strip of rubber about a roll having a semi-circular peripheral cross-section, and then transferring said strip from said roll to an annular member upon which said strip will retain its longitudinally and transversely curved condition.

4. In a method of making curved rubber strips, the steps which consist in feeding raw rubber between rolls having a semi-circular peripheral cross-section, and then transferring the strip from said rolls and placing it on an annular member upon which said strip will retain its longitudinally and transversely curved condition.

Signed by me, this 18th day of May, 1920.

HERBERT R. STRATFORD.